Oct. 26, 1954          W. A. MARTIN          2,692,425
METHOD OF PATCHING OR REPAIRING A METAL SKIN OR COVERING
Filed June 14, 1951          2 Sheets-Sheet 1
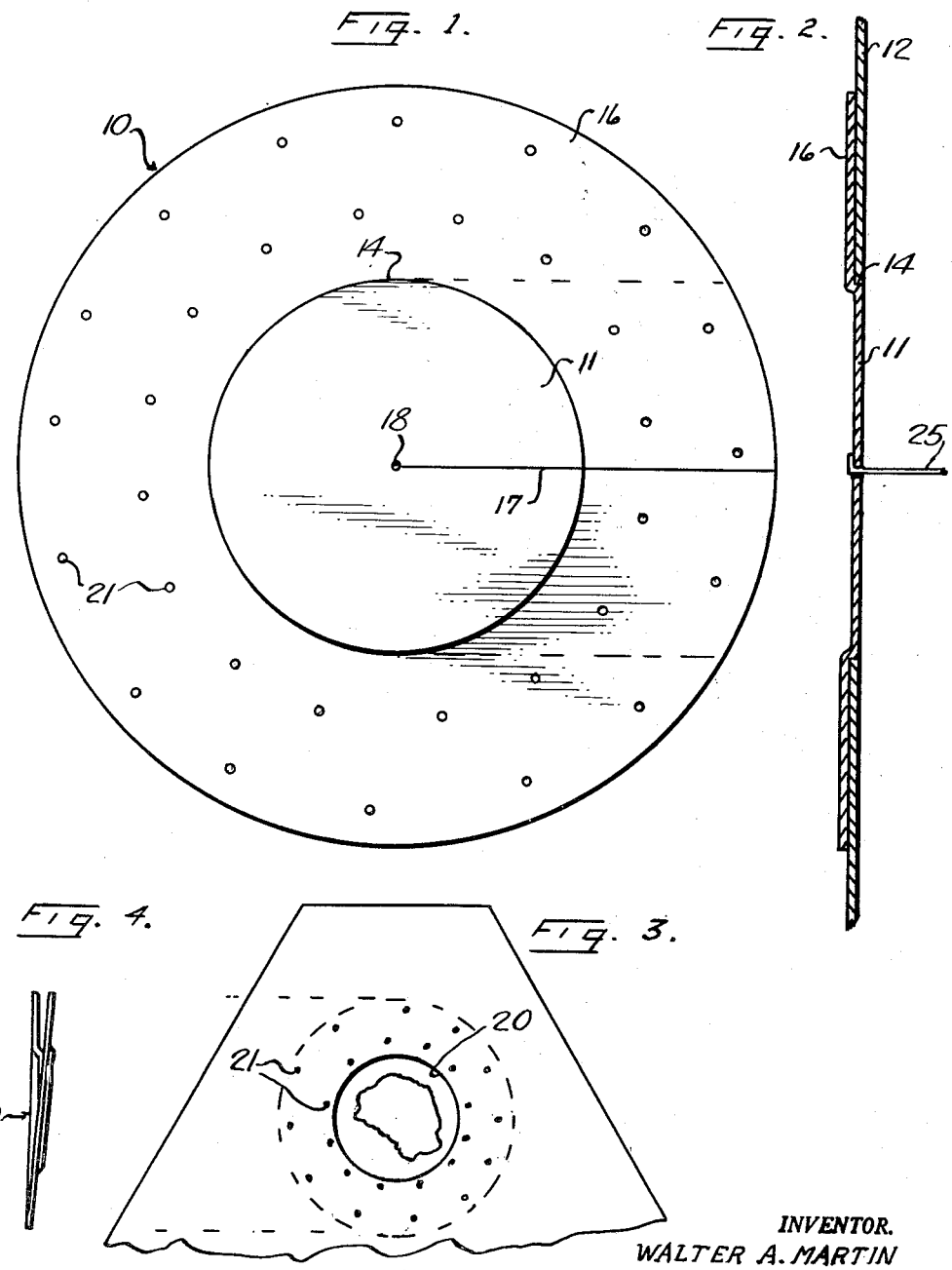
INVENTOR.
WALTER A. MARTIN

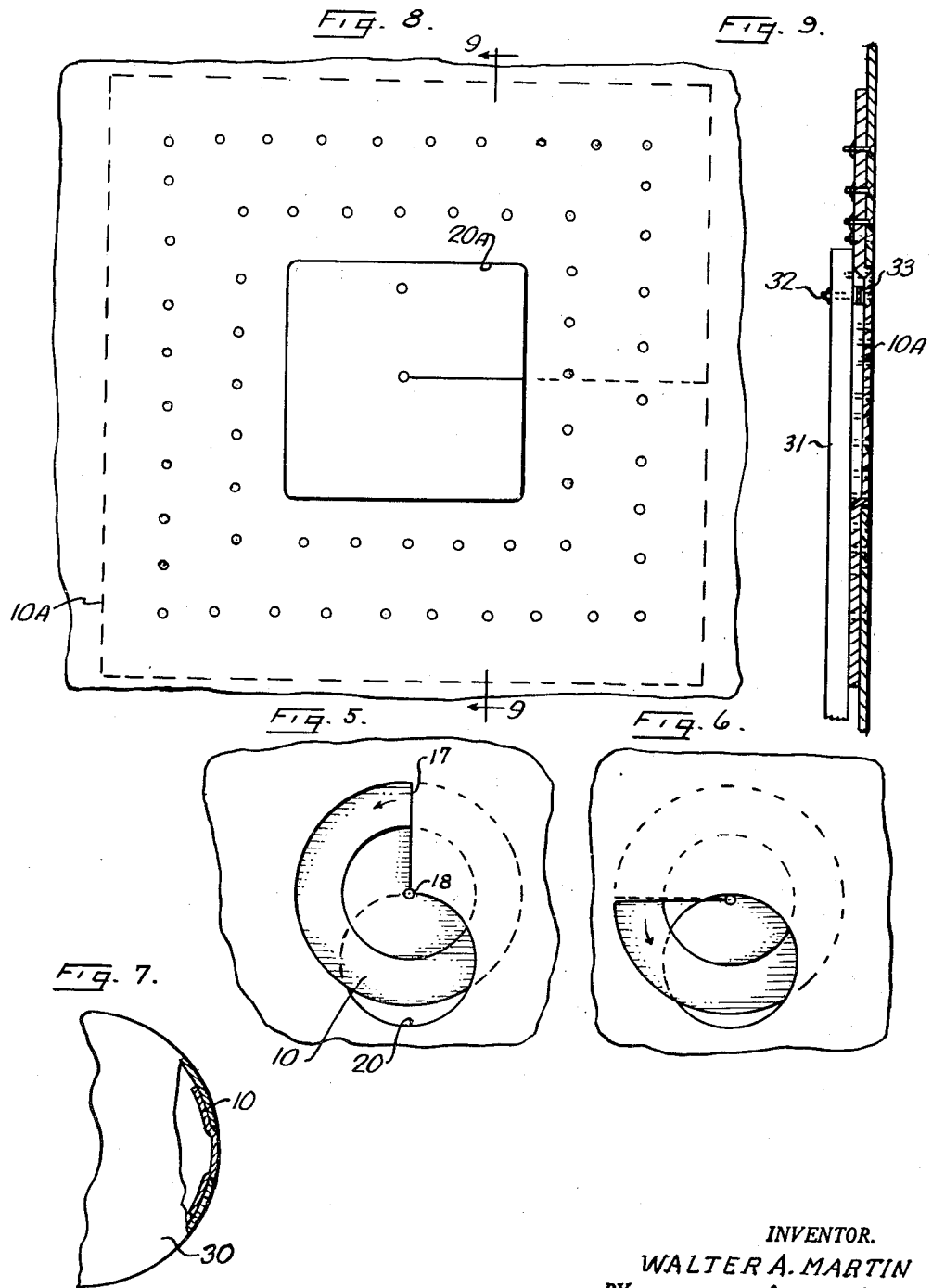

Patented Oct. 26, 1954

2,692,425

UNITED STATES PATENT OFFICE 2,692,425

METHOD OF PATCHING OR REPAIRING A METAL SKIN OR COVERING

Walter A. Martin, Keyport, N. J.

Application June 14, 1951, Serial No. 231,630

3 Claims. (Cl. 29—401)

This invention relates to a method of patching or repairing a metal skin, blanket or covering that has been damaged and more particularly relates to the method of repairing flak damage or other tears in the metal skin covering of an aircraft by cutting or punching a predetermined size and shape opening around the flak or other damage and inserting a previously formed patch to fit the opening cut and in turn fastening said patch securely with blind rivets.

It is a common practice to make aircraft coverings of sheet metal. This sheet metal covering is more specifically referred to as the skin. Due to the extremely smooth surface that must be retained for an aircraft any damage such as that incurred by flak in warfare or abrasions produced by collision with foreign objects in the air or on the ground, it becomes necessary to repair the damage to the skin of the aircraft. In warfare it is of the utmost importance to produce the repair as quickly as possible to return the aircraft to combat use. In the past it has been necessary to dismantle or remove the skin covering from wings and other surfaces that are not easily accessible from the inside in order that the skin may be repaired.

It is an object of this invention to provide the means of quickly and easily repairing any small tear or opening in the skin of an aircraft.

A further object of this invention is to provide a method of repairing any small damage to the skin of an aircraft by forming a plurality of sizes and shapes of patches and by cutting or punching the aircraft skin around the damaged area to a predetermined size and shape so that one of the prepared patches will fit into the opening cut or punched in the skin of the aircraft.

A further object of this invention is to provide the method of inserting a predetermined size and shape patch into a matching opening in the skin of an aircraft in which the patch is slit from its periphery to its center so that the patch may be spread or opened along the slit and inserted through the opening in the skin and the patch may then be rotated into a fitted position and the patch may then be affixed in position by a plurality of blind rivets.

Other objects of this invention may be apparent by reference to the accompanying description and the drawings in which Fig. 1 illustrates a round patch, Fig. 2 illustrates in cross section the patch illustrated in Fig. 1 mounted in an opening of an aircraft skin, Fig. 3 illustrates a wing surface of an aircraft in which a flak hole or puncture has been produced, Fig. 4 illustrates a patch in side elevation similar to Fig. 1 in which the patch is spread open along the slit, Fig. 5 illustrates a similar patch in which a portion of the patch has been inserted through a punched or cut hole in the aircraft skin, Fig. 6 illustrates the same patch after rotating said patch 90°, Fig. 7 illustrates a wing tip patch, Fig. 8 illustrates a square shaped patch, and Fig. 9 is a view taken on line 9—9 of Fig. 8.

In the repair of flak damage to an aircraft, it is necessary to produce a new covering or patch that is perfectly smooth and of the same contour as the wing surface where the patch is mounted, that is, on a flat wing surface it must be perfectly flat, on a wing tip the patch must curve to maintain the same contour as the remainder of the wing tip. Referring to Fig. 3 there is illustrated a typical puncture or hole in an aircraft skin that may have been produced by flak. In repairing this type of damage it is usually necessary to remove one or more of the skin plates and in turn fill the opening or punctured area to produce a perfectly flat covered repaired patch. In this invention it is no longer necessary to remove any of the plates or skin of the aircraft but rather it is necessary to prepare a plurality of predetermined size and shape patches as for example the patch 10 illustrated in Fig. 1. In this instance the patch 10, Fig. 1, is round in shape and is formed as illustrated in Fig. 2 with a central circular area 11 that must align with the outer skin 10 of the aircraft and due to a shoulder formation 14 the patch 10 is also provided with a rim or border 16 also circular in form which provides the supporting and affixing area for the patch. The exact dimension (gauge) or thickness of the skin 12 must be known so that the correct dimension or offset of shoulder 14 may be reproduced when the patch 10 is formed. Thus the patch 10 when mounted into a repair position as illustrated in Fig. 2 will fit snugly into a proper position for affixing. Referring to Figs. 1 and 4 it is apparent that the patch 10 is provided with a slit 17 which may be made from any point along the periphery of the patch to the center of the patch and a ₃⁄₃₂ hole 18 is drilled at the center of the patch. This is to prevent the slit 17 from tearing or extending any further in than the center of the patch. With the patch 10 slit to its center it may be sprung open as illustrated in Fig. 4 and in this position is ready to be inserted into a mating opening 20, Fig. 3. However it is necessary to drill a plurality of matching holes 21 in both the border 16 of the patch 10 as well as the skin or wing surface and in order that this may be accomplished, the patch 10 is first held in contact with the skin in the exact position that the patch will assume when mounted and while the patch is held in this position, the holes 21 are drilled in any pattern similar to that illustrated in Fig. 3. The patch 10 is then ready to be mounted in the opening 20. Since the patch must be held and rotated, a holding instrument 25, Fig. 2, may be used or a common metal screw may be inserted through the hole 18 of the patch. With the element 25 in place, the patch 10 may be inserted through the opening 20 as illustrated in Fig. 5. With the slit 17 open, one half of the patch may be passed through the opening 20 until the drilled hole 18 abuts with the periphery of opening 20. Holding the pin 25, the patch 10 may be rotated counter-clockwise as illustrated by the arrow and referring to Fig. 6 it is apparent that the continued rotation of patch 10 will in a 180° of rotation pass the complete patch inside or under the skin 12, and of course holding pin 25, the patch may be moved until the circular shoulder 14 mates with the periphery of the opening 20 and the patch will then be pulled into the position illustrated in Fig. 2. The patch 10 may then be rotated slightly in either direction until the apertures 21 in the aircraft skin are in alignment with the apertures 21 in the patch 10. Holding the patch in this position a plurality of fasteners may be inserted through the apertures 21 to pull the patch 10 into a tight mating relationship with the wing or skin of the aircraft. Various types of fasteners are available for this particular purpose, a self threading flat headed metal screw may be used. However there are special aircraft fasteners with self locking features. This type of fastener is inserted through the aperture 21 and generally by turning in one direction produces a spreading or locking action at the opposite end of the fastener to thus grip and retain the patch in a tight abutting relationship with the under surface of the skin 12. Referring to Fig. 7 there is illustrated a wing tip 30 and the end of the wing tip is cut away to illustrate in cross section a patch 10 that has been affixed to conform with the contour of the wing tip. This illustrates one of the various modifications that are possible with this type of patch. Referring to Figs. 8 and 9 there is illustrated a square shaped patch 10A which is similar to patch 10 of Fig. 1 except that the shape has been changed and so the patches that are to be utilized may be formed in various other shapes and will be used in the same manner, that is, mounted in the same manner as patch 10 of Fig. 1. Fig. 9 illustrates a still further embodiment in which a patch similar to 10A of Fig. 8 has been installed in an opening 20A in an aircraft skin. If a stringer or stiffener element 31 is encountered when inserting a patch it is necessary to pass the fastener 32 through the patch and through the stringer 31. In such example a filler or washers 33 are provided to fill the space between the patch 10A and the stringer 31.

Although we have described the method of inserting a patch 10 or a patch 10A into a prepared opening 20 in an aircraft surface or skin, it is to be understood that the mechanic in every instance should first insert the patch and try the patch for a perfect fit. In so doing he may mark any irregularity or poor fit so that the patch may be removed and filed until a perfect fit is attained. For example the slit 17 may not fall in a perfect alignment due to a burr on the cut edge. Thus the mechanic may remove this patch and file any irregularity to produce a perfect fit and the patch may then be installed and affixed as described above.

Although we have described an example of an aircraft patch that may be quickly and easily inserted to mend a damaged aircraft skin, we may prepare predetermined size and shape patches of other rigid material to repair other surfaces, skins or blankets in the same spin type method of mounting utilized in mounting the patch described herein without departing from the spirit of this invention and this invention shall be limited only by the appended claims.

What is claimed is:

1. The method of repairing a metal skin or covering which comprises cutting or punching the damaged skin to form a predetermined shaped and size slightly larger than the damaged portion, fitting a patch of the same predetermined shape and size as the opening formed, said patch provided with a recessed border area surrounding said patch, retaining said patch against the skin in its fitted position and drilling a plurality of apertures through the border area of said patch and the skin, drilling an aperture in the center of said patch and slitting said patch from the periphery to the center aperture, inserting a pin or holding means through said center aperture of said patch and mounting said patch in the prepared opening in said skin by inserting one end of the slit patch through said opening, turning said patch so that the inserted end of said patch is rotated behind the skin until the border area of said patch is completely mounted behind said skin, aligning the raised area of said patch with said opening so that the predetermined shape fits in its prepared position, tacking said border area of said patch and said skin by inserting blind rivets through the aligned apertures.

2. The method of repairing the frame and covering of an enclosed airfoil which is inaccessible to an operator from the outside which comprises cutting or punching the damaged skin to form an enlarged opening of a predetermined shape and size, repairing the frame such as a stringer, fitting a prepared patch to said opening, said patch including a border area that is larger than said opening, drilling a plurality of apertures through said border area and skin and any frame work of said airfoil that lies behind said patch while holding said patch in its fitted position, drilling an aperture in the center of said patch and slitting said patch from its periphery to the center aperture, inserting a pin or holding means through said center aperture of said patch, mounting said patch in the prepared opening in said skin by inserting one end of the slit patch through said opening, turning said patch so that the inserted end of said patch is rotated behind the skin until the border area of said patch is completely mounted behind said skin, aligning the apertures in said skin and said border area of said patch, inserting a filler or washer between the surface of said stringer and said patch and positioned in alignment with the aperture drilled through said patch and said stringer, inserting blind rivets through all apertures to retain said patch in a fixed relationship with said skin.

3. The method as set forth in claim 2 in which said patch surface and the surface of said border area are in two planes to provide a shoulder between said surfaces and in which said shoulder is shaped to fit the periphery of the prepared opening in said skin.

References Cited in the file of this patent

UNITED STATES PATENTS

| Number | Name | Date |
|---|---|---|
| 1,116,831 | Meyers | Nov. 10, 1934 |
| 2,412,972 | Dean | Dec. 24, 1946 |
| 2,563,976 | Torosian | Aug. 14, 1951 |

FOREIGN PATENTS

| Number | Country | Date |
|---|---|---|
| 570,106 | Great Britain | June 22, 1945 |